June 3, 1958 J. A. STOKES 2,837,707
SERVOSYSTEM CONTROLLED CONTOUR MACHINING APPARATUS
Filed Jan. 19, 1955 7 Sheets-Sheet 1
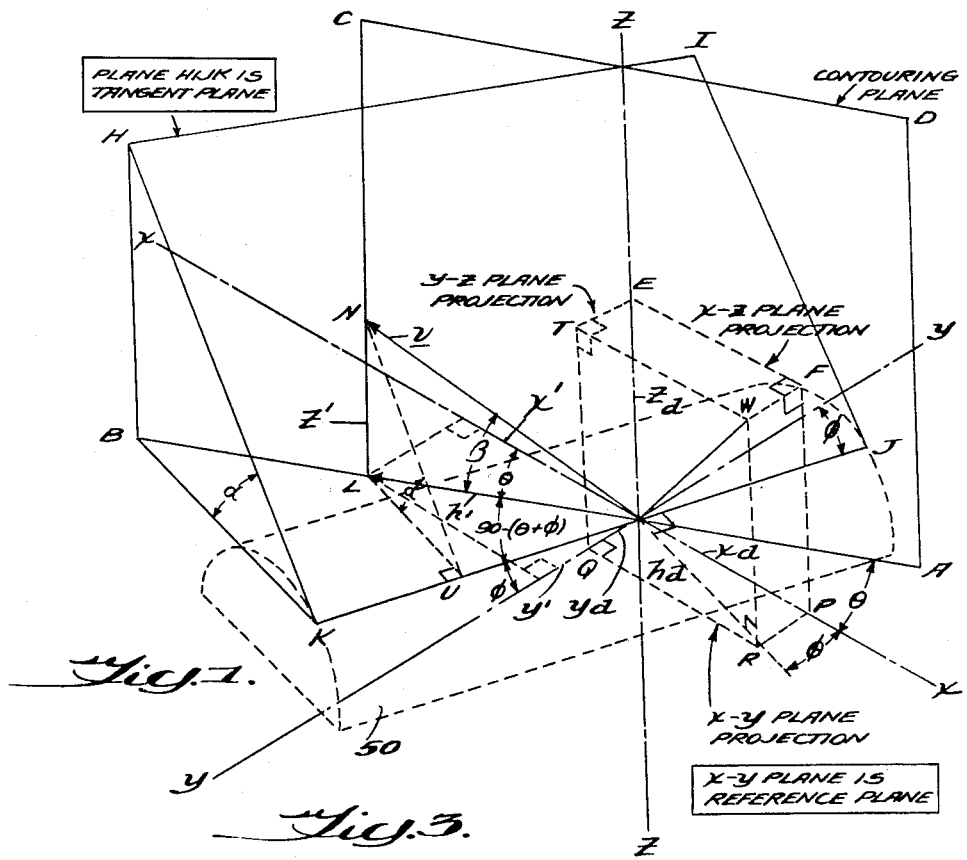
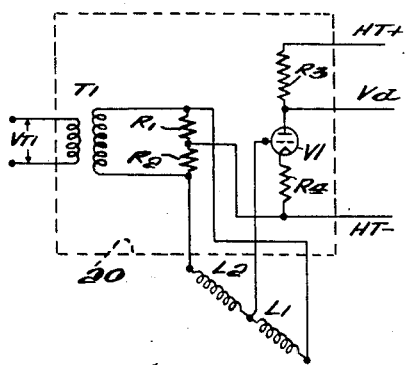
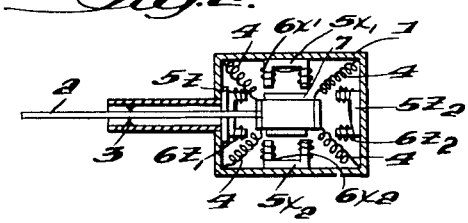
INVENTOR
JOHN ARTHUR STOKES,
BY
ATTORNEY June 3, 1958    J. A. STOKES    2,837,707
SERVOSYSTEM CONTROLLED CONTOUR MACHINING APPARATUS
Filed Jan. 19, 1955    7 Sheets-Sheet 2
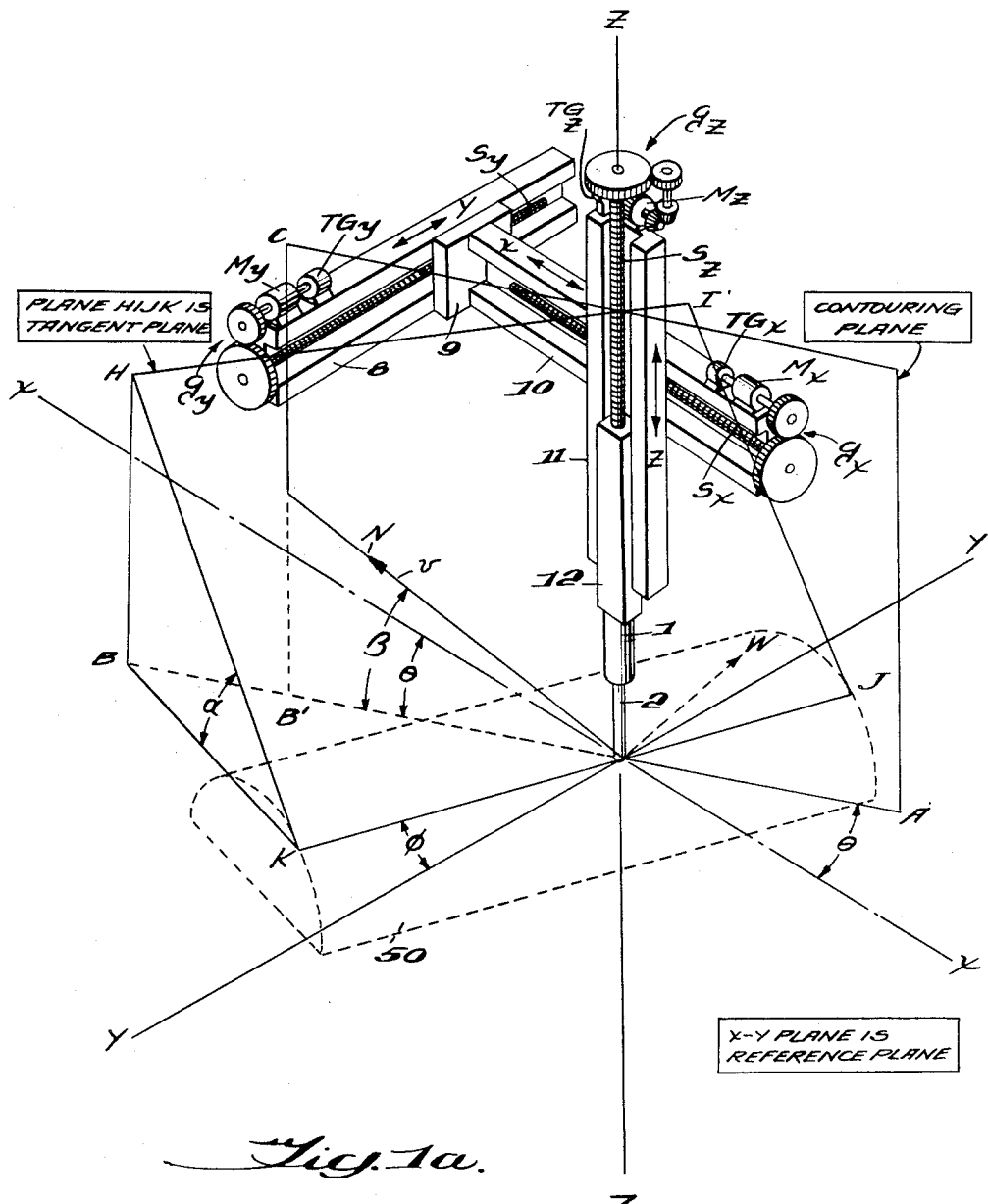
Fig. 1a.
INVENTOR
JOHN ARTHUR STOKES,
BY 
ATTORNEY

INVENTOR
JOHN ARTHUR STOKES
ATTORNEY

June 3, 1958 J. A. STOKES 2,837,707
SERVOSYSTEM CONTROLLED CONTOUR MACHINING APPARATUS
Filed Jan. 19, 1955 7 Sheets-Sheet 5

INVENTOR
JOHN ARTHUR STOKES,

ATTORNEY

June 3, 1958  J. A. STOKES  2,837,707
SERVOSYSTEM CONTROLLED CONTOUR MACHINING APPARATUS
Filed Jan. 19, 1955  7 Sheets-Sheet 6

INVENTOR
JOHN ARTHUR STOKES,
BY
ATTORNEY

INVENTOR
JOHN ARTHUR STOKES,
BY
ATTORNEY

United States Patent Office 2,837,707
Patented June 3, 1958

2,837,707

SERVOSYSTEM CONTROLLED CONTOUR MACHINING APPARATUS

John Arthur Stokes, Rugby, England, assignor to The British Thomson-Houston Company Limited, a British company Application January 19, 1955, Serial No. 482,822

Claims priority, application Great Britain
January 21, 1954

11 Claims. (Cl. 318—39)

This invention relates to contour tracing apparatus by which the contours of a model can be automatically traced, with the intention that a machine tool or other such device, arranged to follow the tracing movements of the apparatus in any known manner, will, by so doing, reproduce the traced contours of the model on a workpiece, thereby to produce an article having the same shape as the model. In particular, the invention is concerned with a novel form of tracing apparatus which is especially useful where the co-ordinates of the surface of a model, as indicated by the required shape of an article to be produced by a controlled machining operation, may vary from point to point with respect to any or all of three mutually perpendicular axes.

Contour tracing apparatus are known, for example in U. S. Patent No. 2,492,731, to Branson, in which a tracing head capable of being driven independently along two mutually perpendicular axes carries a tracing stylus which in turn is deflectable with respect to the tracing head in two mutually perpendicular directions parallel to the plane containing the axes of movement of the tracing head. The apparatus operates in a succession of tracing strokes during each of which the tracing head is moved so that the stylus traces with a fixed amplitude of deflection a surface contour of the model along the line of intersection between the model and a fixed plane parallel to that already mentioned. The engagement of the stylus with the model causes deflection of the stylus in this fixed plane (which may be termed the contouring plane) in a direction substantially normal to the line of intersection at the point of contact between the stylus and model, except insofar as the normality may be affected by friction effects. Any change in the direction of stylus deflection, resulting from a change of direction in the line of intersection due to a bend in the contour being traced, is arranged to effect a corresponding change in the direction of travel of the tracing head (namely by modifying its relative rates of motion along its two axes) in such manner as to maintain the stylus in engagement with the model along said line at a substantially constant amplitude of deflection.

Instead of the tracing head of such apparatus being movable, the tracing head may alternatively remain stationary and the model be caused to move relatively thereto; likewise there may be combined movement of the tracing head and model such as to produce the required relative movements of the one with respect to the other.

Since the orientation of the contouring plane for each tracing stroke is fixed in this known apparatus, the apparatus may be considered as being effectively two-dimensional in its operation. However, the shape of many articles which it might be desirable to machine under the control of a contour tracing apparatus operating in conjunction with a model of the article is such that it would be of advantage to be able to select the orientation of the contouring plane at will for each tracing stroke; the direction of travel of the tracing head and stylus during a tracing stroke, and thus the direction of travel of a following machine tool would not then be restricted to a fixed plane but could be in any direction in space, that is, the operation would be effectively three-dimensional.

It is therefore an object of the present invention to provide a contour tracing apparatus which can operate in this manner.

To this end, the invention provides, in one aspect thereof, a contour tracing apparatus having a tracing head arranged for relative movement with respect to a support along three mutually perpendicular reference axes and carrying a tracing stylus universally deflectable thereon. Suitable signal producing means are mounted in the tracing head and arranged for operation by the tracing stylus for providing electrical signals or voltages responsive to the respective components of deflection of the stylus along the three reference axes. This means may comprise suitably energized inductances, variable in accordance with the respective components of stylus deflection, for producing the desired signals.

Suitable driving means, such as properly geared electric motors, are arranged for driving the tracing head and its stylus independently along each of the three reference axes, and a control system is provided for simultaneously controlling the driving of the tracing head along each reference axis in a manner so as to cause the stylus to follow the shape of a model along any selected course with a substantially constant amplitude of deflection and, if desired, at a selected speed. In order to assure operation of the stylus in this manner, it is arranged to trace a contour of the model along the selected course at a desired angle of orientation with respect to one of the reference axes which defines a reference plane with another axis, and the control system is provided with a computer for deriving, from the selected angle of orientation of the stylus and the three signals resulting from the deflection of the stylus, a direction signal representing the instantaneous direction in space along which the tracing head must move relative to its support for effecting movement of the stylus along the selected course over the surface of the model.

The control system further includes means responsive to the direction signal connected to control the driving means of the tracing head to produce a relative motion between the head and its support corresponding to the instantaneous direction in space of the stylus for tracing the selected course at a substantially constant speed.

In order that the relative rates of motion along the three axes may be controlled in the desired manner a computing arrangement fed with information from the tracing head may be arranged to provide a direction signal of A. C. waveform the phase of which with respect to a reference phase signal represents the slope with respect to the reference plane, at the point of contact between the stylus and the model, of the line of intersection between the model and the instantaneous contouring plane, which direction signal has applied to it, for a purpose to be indicated hereafter, a phase correction dependent on any divergence of the total stylus deflection from a given magnitude. Three signals are also provided, of which two, in phase with each other, are in phase quadrature with the third and have amplitudes related to that of the third by the cosine and sine respectively of the angle of orientation of the selected course. There can then be derived from these latter three signals as a function of the corrected direction signal respective control signals proportional to the actual velocities at which relative motion between the tracing head and model has to be effected along the three axes in order to maintain the stylus in contact with the model along the required course.

The term instantaneous contouring plane as used herein denotes the plane which, extending perpendicularly to the reference plane, either includes the projected tracing course, or, where such course is not linear, is tangential to the tracing course at the point of contact of the stylus and model.

In such computing arrangement the means for obtaining the signal representing the slope of the line of intersection between the model and the contouring plane may be arranged to compute the angle ($\beta$) of the slope from the amplitudes of the co-ordinate components ($x_d$, $y_d$, $z_d$) of the stylus deflection along the three axes, taken in conjunction with the angles ($\phi$ and $\theta$ respectively) made with one of said axes in the reference plane by the direction of the component of stylus deflection measured in that plane on the one hand and by the contouring plane on the other hand.

The signals obtained from the computing arrangement may be used directly for automatically effecting the required motions of the tracing head. Likewise these signals may be used either directly or from recordings thereof to control the motions of a contouring machine.

The invention will be more fully understood from the following description of the accompanying drawings in which:

Fig. 1 is a diagram illustrating the directional relationship between various vectors involved in the operation of a contour tracing apparatus according to the invention;

Fig. 1a schematically illustrates the mounting and driving mechanism of a tracing head and stylus for tracing apparatus conforming to the present invention, and illustrates the relationship thereof to certain vectors involved in a tracing action corresponding to similar vectors in Fig. 1;

Fig. 2 is a schematic illustration in axial section of a tracing head which can be used in carrying out the invention;

Fig. 3 illustrates a circuit for deriving deflection signals from the stylus;

Fig. 4 illustrates a mounting arrangement for the tracing head permitting the required movement thereof along said three axes;

Figure 5:
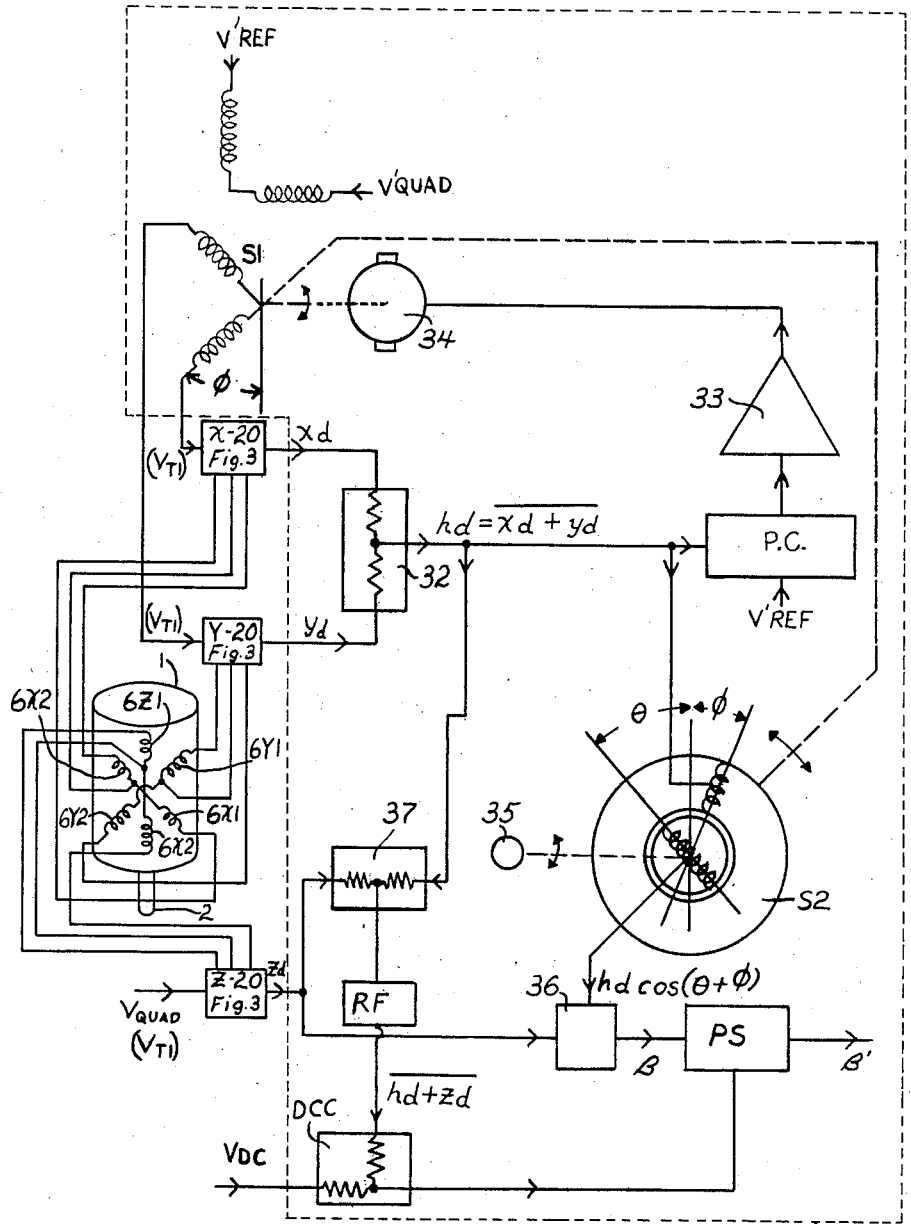
Fig. 5 illustrates diagrammatically an arrangement for computing the required direction of travel ($\beta$) of the tracing head.
Figure 6:
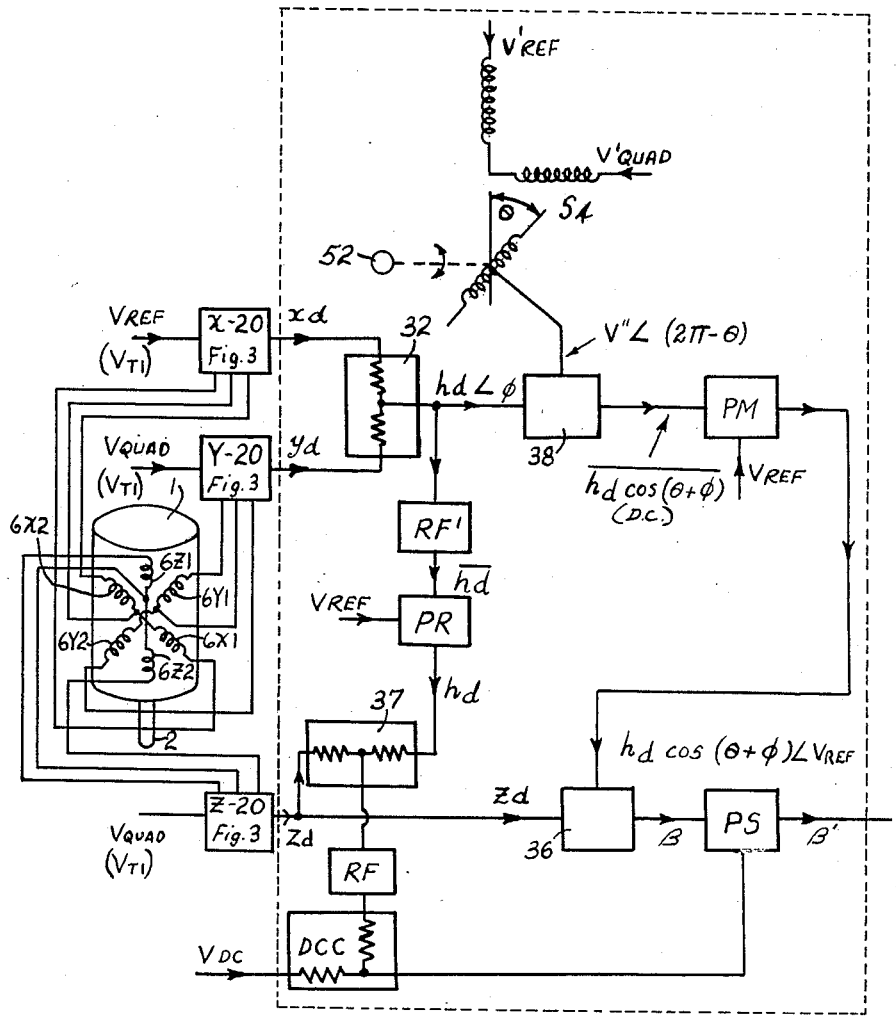
Fig. 6 illustrates an alternative arrangement for computing the direction of travel.
Figure 9:
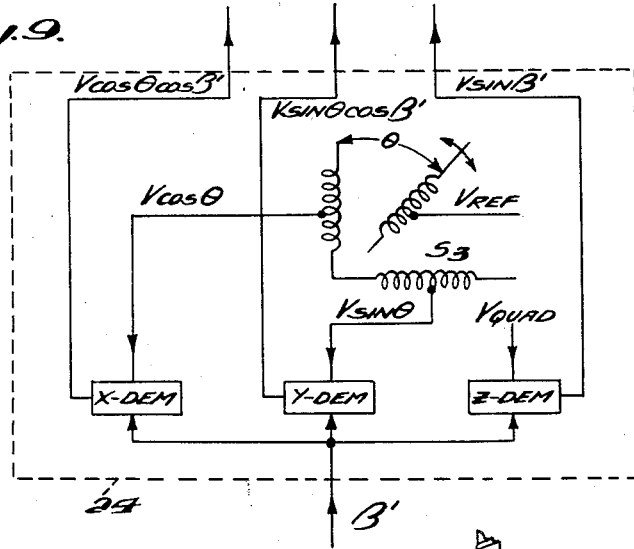
Fig. 9 illustrates an arrangement for computing from the output of the arrangement of Fig. 5 or Fig. 6 the relative rates of motion required by the tracing head along the three axes.
Figure 11:
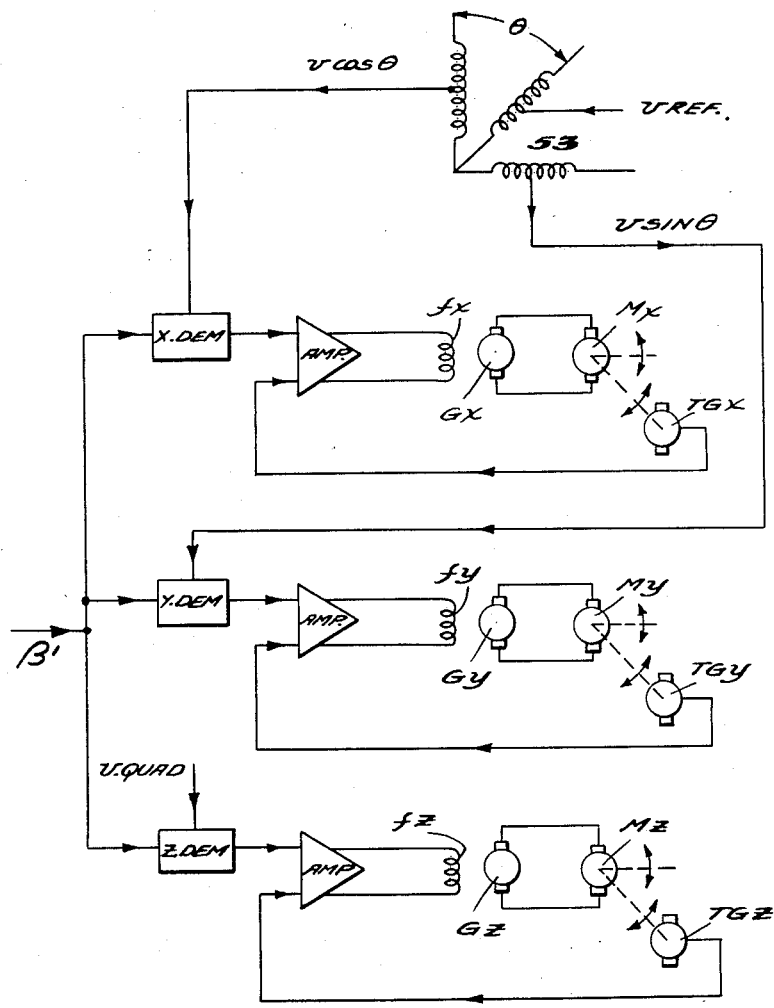
Figure 12:
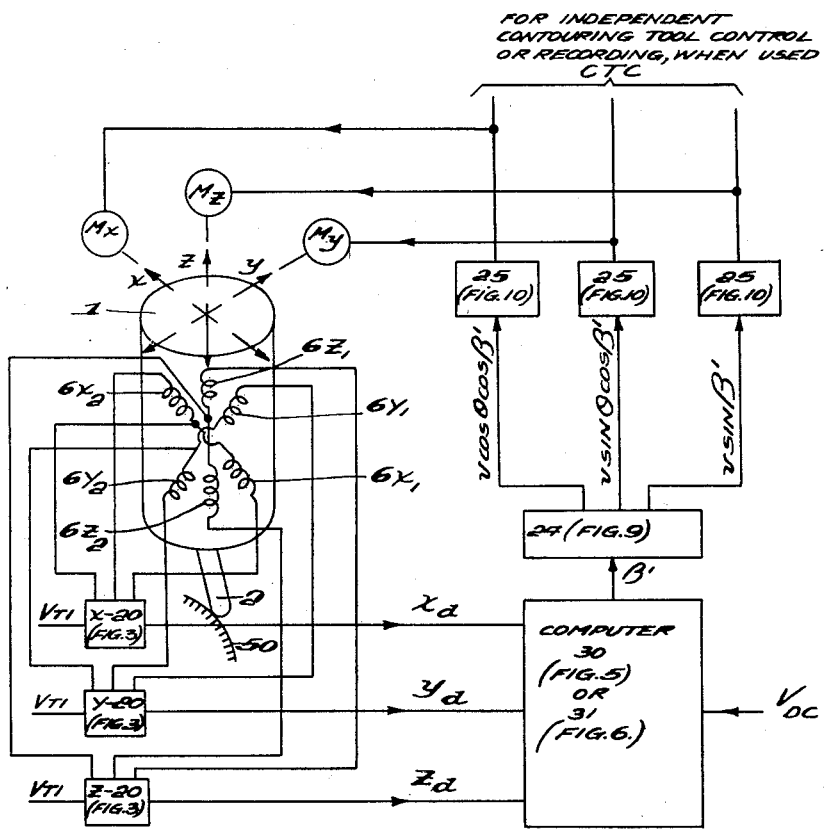

Fig. 11 schematically illustrates the circuitry and elements for utilizing the direction signal obtained from a computer, such as that shown in Figs. 5 or 6, and demodulating it in resolving circuits, such as that of Fig. 9, to provide three signals suitably amplified for driving the tracing head and its stylus along a selected course; and Fig. 12 schematically illustrates a complete circuit for carrying out this invention, utilizing components shown in other figures of the drawings and referred to in this figure by general designations, such as block diagrams.

Referring to the drawings, and particularly to Figs. 1a and 11, a tracing head 1, having a stylus 2 mounted therein for universal deflection against spring biasing, as will be further described with reference to Fig. 2, is mounted for independent movement lengthwise of three mutually perpendicular axes x, y, and z. To this end a horizontal slide 8, parallel to the y axis, carries a saddle 9, which in turn carries another horizontal slide 10 for movement lengthwise of the slide 8 and extending perpendicular to the slide 8 and parallel to the x axis. The slide 10 carries a vertical cross-slide 11, parallel to the z axis, in which a holder 12 can slide vertically, carrying the tracing head 1 at its lower end. Lead screws $S_x$, $S_y$, and $S_z$, rotatably mounted in the slides 10, 8, and 11, respectively, extend parallel to x, y, and z axes and have independent drive mechanisms, including respective motors $M_x$, $M_y$, and $M_z$, and respective gearing $g_x$, $g_y$, and $g_z$, for driving the tracing head independently along each and any of the directions x, y, and z. These drive mechanisms also have tachometer generators $T_{gx}$, $T_{gy}$, and $T_{gz}$ associated with their respective motors for functions which will be discussed later.

During a tracing operation, the stylus 2 engages the surface of a model 50 at an instantaneous point of engagement O and, under ideal conditions, is maintained at a constant amplitude of deflection against its spring biasing. In order to assist in explaining the operation of this invention, various vectors are shown in Figs. 1 and 1a emanating from point O, with their directions referred to the three axes x, y, and z, corresponding to the directions of movement of the tracing head. A plane HIJK, inclined at an angle $\alpha$ to the xy (reference) plane and intersecting it along a line JK, which passes through the point O at an angle $\phi$ to the y axis, represents the tangent plane to the model 50 at the point O. Recalling that the stylus 2 is universally deflectable in the tracing head 1 and that with the stylus in engagement with the model, the reaction force on the stylus must be normal to the surface of the model at the point of contact, if friction effects are excluded, it will be appreciated that the stylus, being universally deflectable, will be deflected in a direction normal to the surface of the model. It follows, therefore, that, at the point O, the stylus will be deflected perpendicularly to the plane HIJK in the absence of friction effects. The magnitude of the stylus deflection will then depend on the relative position of the tracing head with respect to the model. This holds good whether or not the stylus is in motion over the model surface. In the limiting condition in which the stylus is only just touching the model surface, the reaction force, and thus the stylus deflection, will be negligible but will still be normal to the surface in the absence of friction effects.

Referring to Figs. 1 and 1a, the stylus deflection at the point O will, neglecting slight friction effects, be normal to the tangent plane HIJK. The deflection has, therefore, been represented by the vector OW and has also been shown split into its vector components $x_d$ (OP), $y_d$ (OQ), and $z_d$ (OE) along the x, y, and z axes, respectively.

Assuming now that a contour is to be followed along the surface of the model such that the course as projected on to the xy plane remains constant and makes an angle of orientation $\theta$ with the x axis, then the required path is the line of intersection of the model with a plane which extending perpendicularly to the xy plane, passes through the origin O and intersects the xy plane along a line AB making an angle $\theta$ with the x axis; this perpendicular plane ALCD including the line AB thus constitutes the so-called contouring plane. In the following, the xy plane will be taken as being horizontal and the contouring plane accordingly vertical. These perpendicular planes may, of course, have any desired position in practice.

At the point O, the direction of the required path will be along the line ON, representing the line of intersection of the HIJK tangent plane and the contouring plane ALCD through AB. If a perpendicular NL be dropped from N to the xy plane then the point L at which it meets that plane will lie on the line AB, that is, the line OL will make an angle $\theta$ with the $x$ axis. Also, if a line LU be drawn in the $xy$ plane perpendicular to the line JK so that $\angle LUK=90°$ and $\angle NLU=90°$, then $\angle NUL=\alpha$, the inclination of the plane HIJK.

Now as the angle between OL and the $x$ axis $=\theta$ and the angle between OU and the $y$ axis $=\phi$:

$$\angle LOU=(90°-(\theta+\phi))$$

and $$LU=OL \sin (90°-(\theta+\phi))$$
$$=OL \cos (\theta+\phi)$$

But $$NL=LU \tan \alpha$$
$$\therefore NL=OL \cos (\theta+\phi) \tan \alpha$$

or $$\frac{NL}{OL}=\cos (\theta+\phi) \tan \alpha$$

Now the desired direction of travel lies along the line ON, that is along a line in the vertical, or contouring, plane ALCD through AB. This line makes an angle $\beta$ with the $xy$ plane, that is $\angle NOL=\beta$, and $$\tan \beta = \frac{NL}{OL}=\cos (\theta+\phi) \tan \alpha$$

Using this expression, the angle $\beta$ can be computed from a knowledge of the angle of orientation $\theta$ of the contouring plane ALCD and the components of the stylus deflection along the three axes. Now let the amplitude and direction of the stylus deflection at point O be represented by the vector OW and the components of its deflection along the axes $x$, $y$, and $z$ be $OP=x_d$, $OP=y_d$ and $OE=z_d$ (Fig. 1). The sum of the deflection components in the $xy$ plane is $OR=h_d$.

A line $\perp$ to each of two intersecting lines at point of intersection is $\perp$ to all lines through the point of intersection in a plane through and including the two intersecting lines.

OE $\perp$ $xy$ plane
$\therefore$ OE $\perp$ JK at O
OW $\perp$ HIJK
$\therefore$ OW $\perp$ JK at O and to any line in HIJK through O since JK $\perp$ EO and $\perp$ OW at point of intersection O
JK $\perp$ to all lines through O in plane of EO and OW
OR lies in plane of EO and OW, in plane EORW.
$\therefore$ JK $\perp$ OR or KO $\perp$ OR
$\therefore \angle ROY = 90°-\phi$ since $\angle ROY + \angle ROP = 90°$
$\angle ROP = 90°-(90°-\phi)=\phi$ Component $h_d$ is, therefore, at angle $\phi$ to the $x_d$ component of the deflection OW of the stylus. Considering Fig. 1 further, it is seen that:

OW is perpendicular to plane HIJK and therefore to NMU lying in that plane
$\therefore \angle WOR + 90° + \alpha = 180°$ or $\alpha = 90° - \angle WOR$ But $\angle OWR + \angle ORW + \angle WOR = 180°$ and $\angle ORW = 90°$
$\therefore \angle OWR = 90° - \angle WOR$
$\therefore \angle OWR = \alpha$ and $$\tan \angle OWR = \frac{h_d}{z_d} = \tan \alpha$$

If the motion of the stylus relative to the model, namely the motion imparted to the stylus by movement of the tracing head as distinct from deflection of the stylus relatively to the tracing head, is compounded of velocities $x'$, $y'$, and $z'$ measured parallel to the $x$, $y$ and $z$ axes respectively, then to constrain the motion to the vertical plane ALCD through AB, $$\frac{y'}{x'}$$

must equal $\tan \theta$. Hence the horizontal component of motion can be considered as a single vector $h'$ subtending an angle $\theta$ with the $x$ axis, the amplitude $h'$ being the vector sum of $x'$ and $y'$.

The resultant motion is thus compounded of the horizontal component $h'$ and vertical component $z'$ such that $$\frac{z'}{h'} = \tan \beta$$

If the speed of progression of the stylus along the line ON is given by $v$ then $$z'=v \sin \beta, h'=v \cos \beta$$

but $y'=h' \sin \theta$ and $x'=h' \cos \theta$
$\therefore y'=v \cos \beta \sin \theta$ and $x'=v \cos \beta \cos \theta$ Suppose now that a system capable of computing and setting up the desired $x$, $y$ and $z$ velocities were set up with an initial amplitude of stylus deflection equal to '$d$', it being recalled that the deflection of the stylus with respect to the tracing head will at all times be substantially normal to the model surface at its point of engagement therewith. The stylus would then move along the line ON with constant amplitude of deflection, providing that the actual velocities $x'$, $y'$ and $z'$ were absolutely accurate. Any error in these quantities would cause the amplitude of stylus deflection to increase or decrease progressively, without however changing the direction of stylus deflection and therefore without resulting in any change in the direction of travel such as would tend to restore the stylus deflection to its initial value. Hence, if, as is required, the stylus is to remain deflected by a substantially constant amount, the amplitude '$d$' must be measured, and a correction applied to the direction of stylus travel if the amplitude '$d$' departs from its desired value. Such correction in response to change of total stylus deflection is also important in correcting errors arising from tardy response of the tracing apparatus, particularly when negotiating an abrupt corner. As will be appreciated on reaching such a corner not only will the direction of stylus deflection change, resulting in a corresponding change in the direction of travel of the tracing head, but if the tracing head tends to overshoot the magnitude of deflection will also temporarily change to such an extent that the direction of travel tends to be over-corrected, with the overall result that the tracing head is rapidly brought back to its correct course. The correction is applied to the angle $\beta$, since this angle is measured in a plane perpendicular to the $xy$ plane and variation of the angle will thus not vary the direction of contouring $\theta$. The corrected value of $\beta$ will be termed $\beta'$.

The complete computing arrangement has then to perform the following functions:

(a) Compute an angle $\beta$ from the formula $$\tan \beta = \cos (\theta+\phi) \tan \alpha$$

where $\theta$ is the predetermined direction of contouring as selected manually by the operator or set up by other means, $\phi$ is the angle included between the $y$ axis and the line of intersection of the $xy$ plane and tangent plane to the model at the point of contact, and $\alpha$ is the inclination of this tangent plane to the $xy$ plane.

(b) Measure the total deflection 'd' of the stylus, and if it varies from a predetermined value, superimpose a variation on the angle β obtained from (a) to give a corrected value β'.

(c) Accept an independent signal $v$, proportional to the desired velocity along the line of intersection of the model and the contouring plane, and resolve it into two components $v \cos \theta$ and $v \sin \theta$.

(d) Derive from $v$, $v \cos \theta$ and $v \sin \theta$ respective output signals of $v \sin \beta'$, $v \cos \theta \cos \beta'$ and $v \sin \theta \cos \beta'$ respectively.

The basic information required by the computer concerning the components of stylus deflection $x_d$, $y_d$, $z_d$ along the three axes $x$, $y$, $z$, can be obtained by employing a tracing head incorporating for each of three mutually perpendicular axes corresponding to the axes $x$, $y$, $z$ at least one coil the inductance of which depends on the magnitude of the component of stylus deflection along the appertaining axis. Such coils will be termed the $x$, $y$ and $z$ coils in accordance with the particular component of stylus deflection to which they respond. Thus, referring to Figs. 2, 3, and 11 the tracing head may comprise a body 1 and stylus 2, the latter being supported by a bearing 3 and a spring system 4. The bearing 3 is formed so that the stylus can pivot about it in response to transversely applied pressure and can slide into or out of the body 1 in response to axially applied pressure, the spring system 4 being preferably designed so that the mechanical stiffness to deflections of the stylus in any direction, as measured at the stylus tip, is substantially constant. The body 1 carries within it a pair of U-shaped magnetic cores $5X_1$ and $5X_2$ disposed diametrically opposite each other with respect to the stylus axis and carrying respective windings $6X_1$ and $6X_2$ constituting induction coils. A similar pair of diametrically opposite cores $5Y_1$ and $5Y_2$ and coils $6Y_1$ and $6Y_2$ (not seen in Fig. 2) is disposed at right angles to this first pair, and yet another pair of U-shaped cores $5Z_1$ and $5Z_2$ with respective coils $6Z_1$ and $6Z_2$ is disposed within the body 1 at axially displaced positions, the core $5Z_1$ nearer the end of the body 1 from which the stylus 2 projects being suitably formed to pass the stylus without interfering with deflection thereof. The inner end of the stylus 2 carries packets of magnetic laminations 7 which co-operate with the inwardly directed limbs of the several magnetic cores so that deflection of the stylus in the direction from one of the cores of any pair towards the other (corresponding to deflection in one or other of the axes $x$, $y$ and $z$) causes a differential change in inductance of the two coils of that pair.

Signals proportional to the amplitudes of the components of stylus deflection along the three axes can then be obtained from respective A. C. bridge circuits each including the pair of tracing head coils provided for the axis to which that circuit pertains. Thus referring to Fig. 3 each of the three bridge circuits required may comprise two equal resistive arms R1 and R2 and two inductive arms L1 and L2, the latter being constituted by the relevant pair of coils $6X_1$ and $6X_2$, $6Y_1$ and $6Y_2$, and $6Z_1$ and $6Z_2$ in the tracing head, the suffixes 1 and 2 of the coil designations correspond to the suffixes 1 and 2 of the inductances L1 and L2 in Fig. 3. The bridge is energized over a transformer T1 and the bridge output, appearing between the junction point of the resistive arms R1 and R2 and that of the inductive arms L1 and L2, is applied to a thermionic valve amplifier comprising in usual manner a thermionic valve V1, an anode load resistor R3 and a cathode bias resistor R4. As will be readily appreciated, differential change of inductance in the branches L1 and L2 will produce a corresponding change in output at the anode of the valve V1. Thus if the stylus is deflected in any direction—which will cause differential inductance change in at least one of the pairs of tracing head coils, depending on what are the components of stylus deflection along the three axes— the bridge circuit including such pair of coils will produce an output which is proportional to the component of stylus deflection along the axis to which that pair of coils appertains, the phase of the output depending on the phase of the supply $V_{T1}$ energizing the bridge and being reversed for opposite senses of that component of the stylus deflection. With the exception of the tracing head coils themselves the components of the three bridge circuits, connected to the coils over suitable leads, may be accommodated in, for example, a control cubicle (not shown) housing also the components for the other circuitry required.

Dealing now with the various functions which, as set forth above, the computing arrangement has to fulfill, the measurement of the total amplitude of deflection of the stylus (function (b)) can be effected by deriving from the three mutually perpendicular components $x_d$, $y_d$, $z_d$ of the stylus deflection a value $\sqrt{x_d^2 + y_d^2 + z_d^2}$. To this end, if the $x$ and $y$ coils of the tracing head are excited in phase quadrature and the resulting outputs (for example from respective bridge circuits 20 such as that of Fig. 3) are added together, a resultant signal will be obtained proportional in amplitude to $h_d = \sqrt{x_d^2 + y_d^2}$ and of phase $\phi$ with respect to the phase of the excitation of the $x$ coils. If this resultant signal can be arranged to be in phase quadrature with the output from the $z$ coils in the tracing head then their sum will give a resultant signal of amplitude proportional to $\sqrt{h_d^2 + z_d^2} = \sqrt{x_d^2 + y_d^2 + z_d^2}$ as required. The necessary phase relationships can be obtained in two general ways:

(1) By varying the phase of the excitation to the $x$ and $y$ coils of the tracing head or the phase of the excitation to the $z$ coils in such manner as to maintain the resultant $h_d$ and $z_d$ signals in phase quadrature, and (2) By maintaining all the coil excitations in fixed phase and subsequent shifting the $h_d$ or $z_d$ signal to give the quadrature relationship.

Considering now function (a) referred to above, a phase angle β has to be produced where $$\tan \beta = \tan \alpha \cos (\theta + \phi) = \frac{h_d \cos (\theta + \phi)}{z_d} \left( \text{since } \tan \alpha = \frac{h_d}{z_d} \right)$$

This can be effected by adding together signals of amplitudes proportional to $h_d \cos (\theta + \phi)$ and to $z_d$ and in phase quadrature with each other.

Thus the functions (a) and (b) both require a signal proportional to $z_d$, and if the same $z_d$ signal is to be used for both then two other signals of magnitude proportional to $h_d$ and $h_d \cos (\theta + \phi)$ respectively are required each of the same phase, namely in quadrature with the $z_d$ signal. The manner in which the $h_d \cos (\theta + \phi)$ signal is obtained will usually depend on the manner in which the required relationship between the $h_d$ and $z_d$ signals is obtained.

Two possible arrangements each of which fulfills the functions (a) and (b) referred to will now be described in detail with reference to computers 30 and 31, respectively in Figs. 5 and 6, in both of which the tracing head is shown in schematic form with its coils $6X_1$ and $6X_2$, $6Y_1$ and $6Y_2$, and $6Z_1$ and $6Z_2$ connected to blocks X-20, Y-20, and Z-20 which represent circuits, such for instance as circuits 20 of Fig. 3, from which respective signals can be obtained, the magnitudes of which are proportional to the components of stylus deflection $x_d$, $y_d$ and $z_d$ and the phase of each of which depends on that of the voltage $V_{T1}$ supplied to the appertaining circuit, as explained later.

Referring then to Fig. 5, the circuits X-20 and Y-20 are supplied respectively with two A. C. voltages $V_{T1}$ which are in quadrature with each other and which are derived from the secondary, assumed to be the rotor, coils of a rotating field device S1, such as a selsyn, by which the phase angles of the two output voltages, while remaining in quadrature with each other, can be altered with respect to a voltage $V_{REF}$ of reference phase by rotating the rotor. A rotating field is set up in the device S1 by a polyphase supply $V'_{REF}$, $V'_{QUAD}$ applied to the primary. The $x_d$ and $y_d$ signals derived from the circuits X–20 and Y–20 are thus in phase quadrature and can be added together to give a resultant signal proportional to $h_d$. This is done in a circuit 32 which may simply comprise two series-connected resistors receiving the $x_d$ and $y_d$ signals at their outer ends and giving the $h_d$ signal at their junction point. This $h_d$ signal is compared in phase with that of the reference voltage in a phase comparison unit P. C., and any difference in phase is used to control the position of the rotor of the device S1 by means of a servo system comprising an amplifier 33 and motor 34, whereby to maintain the $h_d$ signal in reference phase. It will be apparent to those skilled in the art that to achieve this, the rotor of device S1 will be rotated through an angle $\phi$ (the phase angle between the $x_d$ signal and the $h_d$ signal) from the position in which the circuit X is supplied with a voltage of reference phase.

Mechanically coupled to the rotor of the device S1 is the primary of a rotating field device S2, which again could be a selsyn and to the primary of which is applied the $h_d$ signal of reference phase. The secondary of the device S2 has a voltage induced in it which is in time phase with the primary voltage and has a maximum amplitude when the primary and secondary windings are in line with each other. If the primary is rotated through the angle $\phi$ in one direction and the secondary through an angle $\theta$ in the opposite direction, then the output from the secondary, still in phase with the primary voltage, will have a magnitude proportional to $h_d \cos(\theta + \phi)$. The angle $\theta$, which is the direction of the contouring plane with respect to the $x$ axis, can be set up by the operator, by means of a handwheel 35 for instance, or by other means.

The circuit Z–20 producing the $z_d$ signal corresponding to the $z$ vector of the stylus deflection is fed with a voltage $V_{QUAD}$ which is in time phase quadrature with the voltage $V_{REF}$ of reference phase. The output of this circuit Z–20 is added to the output from the secondary of the device S2 in a circuit 36 which, like the circuit 32, may simply comprise two series-connected resistors. A resultant signal is thus obtained which is displaced with respect to the $z_d$ signal by an angle $(\lambda)$ such that $$\tan \lambda = \frac{h_d \cos(\theta + \phi)}{z_d}$$

It is known from Fig. 1 however, as previously derived, that $$\frac{h_d}{z_d} = \tan \alpha \therefore \tan \lambda = \tan \alpha \cos(\theta + \phi)$$

This expression is identical with that for $\tan \beta$, and therefore the angle $\lambda$ which has been derived is identical with the angle $\beta$, which in the absence of friction would be the angle of the desired direction of travel of the stylus with the respect to the $xy$ plane. The angle $\beta$ has thus been derived in terms of a phase angle so that function (a) above has been fulfilled.

Having obtained a signal of phase angle $\beta$, it is now necessary to modify this phase angle in order to compensate for errors in the stylus deflection due to extraneous causes, such as friction, to fulfill function (b) above. The total amplitude of the stylus deflection is given by $\sqrt{x_d^2 + y_d^2 + z_d^2} = \sqrt{h_d^2 + z_d^2}$. Since the $h_d$ and $z_d$ signals derived from the units H and Z are in phase quadrature their sum will have a magnitude proportional to $\sqrt{h_d^2 + z_d^2}$ and will thus represent the total stylus deflection. Accordingly, in the arrangement of Fig. 5, the $h_d$ and $z_d$ signals are added together in a circuit 37, which, again like circuit 32, may simply comprise two series resistors, and the resultant is rectified in RF to produce a D. C. signal proportional to the amplitude of the stylus deflection. In order that the tracer stylus 2 may trace around the model 50 at constant deflection in a selected direction, an arrangement of circuits is provided which utilizes the actual total amplitude of stylus deflection signal, the magnitude of the vector sum of $\sqrt{h_d^2 + z_d^2}$, and compares it to a direct current reference voltage $V_{DC}$, selected at will and fixed to represent the desired constant amplitude of deflection of the stylus. This provides a very convenient and direct way of assuring continuous contact and accurate tracing of the model by the stylus, and provides for complete compensation against slight errors due to friction or other causes. This desirable result is obtainable by comparing the direct current signal representing the total amplitude of actual stylus deflection obtained from RF, as through series-connected resistors in a circuit DCC, to the selected fixed D. C. reference signal $V_{DC}$ representing the desired amplitude or value of stylus deflection. If the stylus deflection departs from its desired value, an error signal representing the extent of the departure is obtained from this comparison, and such error signal is then used, as by applying it to control a phase shifting unit PS, to superimpose a correction on the angle $\beta$ is any convenient manner, several ways of doing this being known from two dimensional profiling systems. The correct sense for the correction can readily be determined, since a decrease in stylus deflection implies that the tracing head is tending to draw the stylus away from the model, requiring the phase angle $\beta$ to be reduced to stop this action. The converse applies for an increase in stylus deflection so that the proper sense of correction can be obtained for either occurrence by making the phase shifter PS sensitive to the polarity of the output from the unit DCC.

Referring now to Fig. 6, which illustrates an alternative arrangement to that of Fig. 5, the circuits X–20 and Y–20 are this time excited with voltages $V_{T1}$ which are respectively reference and quadrature voltages $V_{REF}$ and $V_{QUAD}$, while the circuit Z–20 is again excited by the quadrature $V_{T1}$ voltage $V_{QUAD}$. The $x_d$ and $y_d$ signals are added in circuit 32 to give a resultant signal of amplitude proportional to $h_d$ and to phase angle $\phi$. This resultant $h_d$ signal is applied to a phase-conscious demodulator 38 to which is also applied a bias voltage of phase angle $(2\pi - \theta)$ so that an output will be obtained which is a D. C. signal of amplitude proportional to $h_d \cos(\theta + \phi)$. A suitable phase-conscious demodulator 38 employing biased rectifier bridges is illustrated in Fig. 7.

Referring to this latter figure, two full-wave rectifier bridges RB1, RB2 are connected in series with a common resistor R5 across respective halves of the secondary winding of a transformer T2 to the primary of which the $h_d$ signal is applied. Diagonally opposite terminals of each rectifier bridge are connected to the secondaries of the transformer T–2 and the resistance R5, so as to provide full-wave rectification of voltages from the transformer secondary. The diagonally opposite terminals of one rectifier bridge are connected through a resistor (not shown) to a biasing voltage having a phase $(2\pi - \theta)$ and those of the other rectifier bridge to a corresponding biasing voltage of opposite phase. These biasing voltages can be obtained from separate secondary windings 40 and 41 on transformer T3, the primary of which is fed with a voltage V" of phase $(2\pi - \theta)$. As indicated in Fig. 6, this latter voltage may be obtained from a selsyn S4, the primary of which is energized by a polyphase supply $V'_{REF}$ and $V'_{QUAD}$ and the secondary being angularly adjustable by an operator manually, as by a handwheel 52, or by other means to give the required phase angle $(2\pi - \theta)$ to the output. The secondaries 40 and 41 of the transformer T3 are provided with terminals 40a and 40b and 41a and 41b, which are suitably connected respectively to rectifier bridge terminals 40a' and 40b' and 41a' and 41b'.

Figure 7:
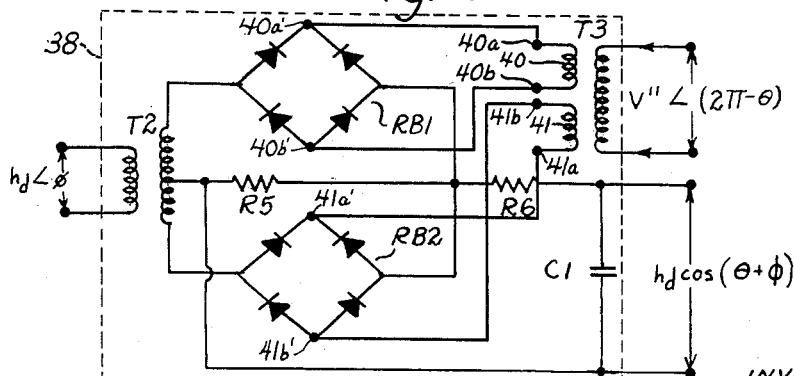
Figs. 7 and 8 illustrate respective circuits which may be employed in the arrangement of Fig. 6.

As is well known, the output of the demodulator 38 of Fig. 7, taken across the resistor R5, and smoothed by capacitor C1 in conjunction with resistor R6 will have an amplitude of mean value proportional to $h_d \cos(\theta+\phi)$.

Figure 8:
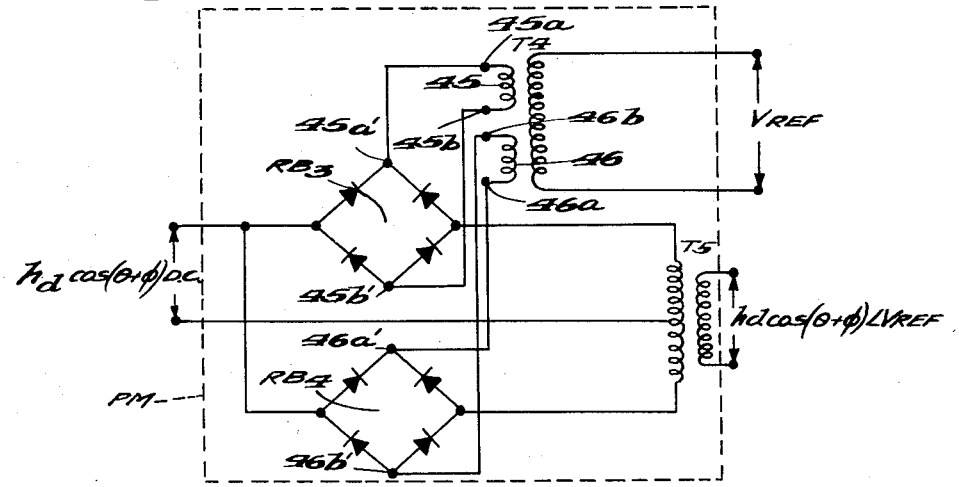

The D. C. output from the demodulator 38 (Fig. 6) is applied to a modulator circuit PM which receives also a voltage $V_{REF}$ of reference phase and gives an alternating output which has a magnitude proportional to the D. C. input thereto—in this case proportional to $h_d \cos(\theta+\phi)$—and is in time phase with the voltage $V_{REF}$. A possible circuit for PM is illustrated in Fig. 8, in which, briefly, a biased rectifier bridge RB3 is connected between one side of the D. C. input and one end of the primary winding of a transformer T5 while another biased rectifier bridge RB4 is connected between the same side of the D. C. input and the opposite end of the transformer primary, the other side of the D. C. input being directly connected to the centre of the transformer primary. A. C. bias voltages for the rectifier bridges RB3, RB4 are applied at the terminals 45a, 45b, and 46a, 46b, respectively, from separate secondary windings 45 and 46 of a transformer T4 the primary of which is fed with a voltage ($V_{REF}$) of reference phase. As indicated by the terminal references the bias voltages as applied to the rectifier bridges are in opposite phase so that the two bridges will be rendered conductive on alternate half cycles of the reference phase voltage. When bridge RB3 is conductive the D. C. input voltage is applied across the upper half of the primary of transformer T5, resulting in a voltage of proportionate amplitude being induced in the secondary with one polarity, whereas when the bridge RB4 is conductive, the D. C. input is applied across the lower half of the transformer secondary, again resulting in a voltage of proportionate amplitude being induced in the secondary but this time with the opposite polarity. Accordingly, as the bias voltages render the rectifier bridges RB3 and RB4 alternately conductive, an output is obtained from the secondary of the transformer T5 which alternates in phase with the reference voltage between values of opposite polarity each proportional to the D. C. input. This output, which will thus have a generally rectangular waveform can then be filtered to give a substantially sinusoidal voltage of the required proportionate amplitude and reference phase.

As will be appreciated other circuits may be employed for the circuit PM of Fig. 6, as may be most suitable in consideration of the supply frequency and the tolerance on the supply frequency.

Having now obtained a signal of amplitude $h_d \cos(\theta+\phi)$ in reference phase this is applied to the circuit 36 as in Fig. 5, where it is added to the $z_d$ signal obtained from circuit Z in quadrature phase, thereby to provide the required signal of phase angle $\beta$.

Since the $h_d$ signal obtained from the circuit 32 in Fig. 6 is of phase $\phi$ it cannot in this case be directly added to the $z_d$ signal to give a signal proportional to the total stylus deflection. Accordingly, to obtain this latter signal, the $h_d$ signal from unit 32 is rectified in RF' to give a D. C. signal of amplitude proportional to $h_d$. This D. C. signal is applied to a modulator circuit PR which receives also the voltage $V_{REF}$ of reference phase and produces an output of magnitude proportional to the D. C. signal and of reference phase; this circuit PR fulfils a similar function to the circuit PM and can therefore be similarly constituted, for instance by a circuit such as that illustrated in Fig. 8. The output from the circuit PR is then taken to a circuit 37 (corresponding to the circuit 37 in Fig. 5) for addition to the $z_d$ signal from the unit Z–20, the resultant, rectified in RF, being compared in unit DCC with a reference D. C. voltage $V_{DC}$, selected to represent the amplitude of the desired constant deflection of the tracing stylus 2, and any comparison difference error being applied to the phase shifter PS to modify the angle to $\beta'$ as before.

This latter comparison circuit is the same as that previously explained with reference to Fig. 5.

In accordance with the required function (c) above, it is now required to accept an independent signal $v$, proportional to the desired velocity along the line of intersection of the model and the contouring plane and resolve it into two components $v \cos \theta$ and $v \sin \theta$. Referring to Fig. 9, this is done by means of a resolving circuit 24, including a selsyn or similar device S3 which has a single coil on its rotor and two coils in quadrature on its stator. A voltage $v$ of amplitude $v$ and reference phase is applied to the rotor coil and an angle $\theta$ is set up between this latter coil and one of the stator coils with the result that the outputs from the stator coils will have magnitudes equal to $v \cos \theta$ and $v \sin \theta$ respectively, both being of reference time phase. The positioning of the rotor may be effected by mechanically coupling it to the rotor of selsyn S2 (Fig. 5) or S4 (Fig. 6) whichever is used in obtaining the $\beta'$ signal.

The signal of time phase $\beta'$, derived by the computor 30 or 31 of Fig. 5 or Fig. 6 is fed as a bias voltage to three similar demodulators, the $x$ demodulator $X_{DEM}$, the $y$ demodulator $Y_{DEM}$ and $z$ demodulator $Z_{DEM}$, which may be similar to that illustrated in Fig. 7. To the $x$ demodulator is applied the voltage $v \cos \theta$ of reference phase, to the $y$ demodulator the voltage $v \sin \theta$ of reference phase, and to the $z$ demodulator a voltage $v_{QUAD}$ which is in time phase quadrature with the voltage $v_{REF}$ and of equal amplitude. As a result the following outputs are obtained, namely:

$v \cos \theta \cos \beta'$ from the $x$ demodulator
$v \sin \theta \cos \beta'$ from the $y$ demodulator
and
$v \sin \beta'$ from the $z$ demodulator These outputs are thus proportional to what have already been shown to be the required speeds in the $x$, $y$ and $z$ directions respectively and can be fed in a conventional manner to provide reference voltages for the three feed-drive mechanisms for the tracing head mounting.

The outputs from the demodulators $X_{DEM}$, $Y_{DEM}$ and $Z_{DEM}$ are applied via amplifying circuits 25, Fig. 10, including amplifiers AMP to energize the field windings $f$ of respective generators G ($G_x$, $G_y$, and $G_z$, Fig. 11) feeding the motors M ($M_x$, $M_y$, and $M_z$, Fig. 11) by which, as already described in connection with Fig. 1a, the tracing head 1 can be driven independently along the three axes. Each of the motors M ($M_x$, $M_y$, and $M_z$), also drives a tachometer generator TG to provide a velocity feedback to the input of the respective associated amplifier AMP, this feedback signal being compared with the output from the respective demodulator DEM and any difference being effective to modify the excitation of the generator field winding $f$ ($f_x$, $f_y$, and $f_z$) in such direction as to adjust the motor speed in the direction to reduce such difference. Thus, the drive mechanisms operate as error actuated servo-mechanisms to drive the tracing head 1 along the $x$, $y$, and $z$ axes at speeds respectively proportional to the outputs from the demodulators $X_{DEM}$, $Y_{DEM}$, and $Z_{DEM}$.

By thus controlling the three feed drive mechanisms for the tracing head mounting in accordance with the outputs from the $x$, $y$ and $z$ demodulators respectively, the tracing head will be driven along the $x$, $y$ and $z$ directions at the required relative speeds for producing a resultant motion such that the stylus will trace a contour of the model along the course set up by the operator's selection of the angle $\theta$. Having effected one controlled tracing stroke in this manner, a subsequent stroke can be effected, along a course somewhat displaced with respect to the first, by initially offsetting the starting position of the tracing head and/or by selectively adjusting the angle $\theta$ to a different value, in which latter case the course followed in such subsequent tracing stroke would not be parallel to that followed for the first stroke.

Figure 10:
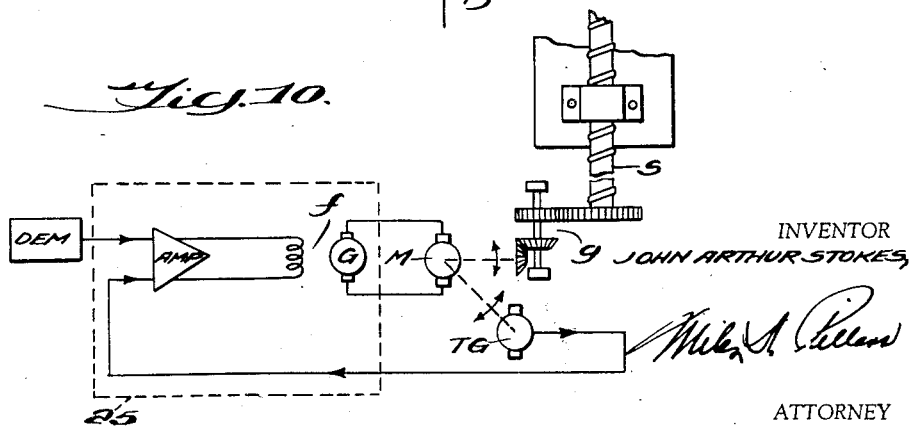
Fig. 10 illustrates a drive mechanism by which the required motion along an axis can be imparted to the tracing head.

The output signals from the demodulators $X_{DEM}$, $Y_{DEM}$, and $Z_{DEM}$ can also be applied for control of a contouring tool by suitable connections to the terminals CTC, Fig. 11, either directly or from recordings thereof to separate feed drive mechanisms, such for example as that illustrated in Fig. 10, for controlling the linear motion along three mutually perpendicular axes of a contouring tool. The contouring tool can be similar to Fig. 4, with the tracing head 1 replaced by an appropriate tool, and will then follow the movements of the tracing head. A contouring tool may however be arranged to follow the movements of the tracing head in any other manner, mechanically, electrically or otherwise; for instance the tool may be mounted fast with the tracing head for movement therewith, the model and a workpiece being then mounted together on, say, a fixed baseplate with a spacing between them equal to that between the tool and the tracing stylus.

It will be appreciated that in the foregoing description representative devices have been illustrated and the invention is intended to cover alternative devices which would produce the required result. For instance, the device S2, which requires both the primary and the secondary to be rotatable, could be replaced by two such devices in which only the secondaries (or primaries) need to be rotatable.

What I claim is:

1. In a contour tracing apparatus, a tracing head arranged for relative movement with respect to a support along three mutually perpendicular reference axes, a stylus carried by the tracing head and universally deflectable with respect thereto, said stylus being adapted to engage the surface of a model on said support for tracing a contour thereof along a selected course having a desired angle of orientation with respect to one of said axes which defines a reference plane with another of said axes, means for driving the tracing head independently along each of said three axes, and means for simultaneously controlling the driving of the tracing head along each reference axis in such manner as to cause the stylus to follow the shape of the model along the selected course with substantially constant deflection, said controlling means comprising means responsive to the components of stylus deflection along said three axes for providing signals respectively proportional to these components, computing means for deriving from these signals in conjunction with the desired value of said angle of orientation a direction signal representing the instantaneous direction in space along which relative movement needs to be effected between the tracing head and support for the stylus to follow the model surface along the selected course, and means responsive to the direction signal for controlling the respective driving means to produce between the tracing head and support a resultant relative motion in said instantaneous direction appropriate to the stylus tracing the model surface along said course at a substantially constant speed.

2. A computing arrangement for use in conjunction with contour tracing apparatus as claimed in claim 1 comprising means for deriving a direction signal of alternating current waveform the phase of which with respect to a reference phase signal represents the slope with respect to a reference plane of the line of intersection between a model and the instantaneous contouring plane at the point of contact of the stylus and the model, means for applying to said direction signal a phase correction dependent on divergence of the total stylus deflection from a given magnitude, means for providing three signals of which two in phase with each other are in phase quadrature with the third and have amplitudes related to that of the third by the cosine and sine respectively of the desired angle of orientation of the selected course, and means for deriving from these latter signals as a function of the corrected direction signal respective control signals proportional to the actual velocities at which relative motion between the tracing head and model has to be effected along the three reference axes in order to maintain the stylus in contact with the model at constant deflection along the selected course.

3. A controlling means as claimed in claim 1 for use in conjunction with contour tracing apparatus including two electrical circuits responsive to the respective components of stylus deflection along said axes in the reference plane to provide deflection signals representing the magnitudes of those components and a third circuit responsive to the component of stylus deflection along the third axis and energizable with current of quadrature phase to provide the required signal representing the magnitude of such component and of quadrature phase, comprising a computing arrangement having an electromagnetic induction device having primary windings energizable with polyphase current of reference and quadrature phase relationship to produce a rotating field and a pair of secondary windings disposed electrically in quadrature with each other and having an adjustable angular position with respect to said primary windings, which pair of secondary windings are connected respectively to energize said two circuits whereby the deflection signals provided thereby are in quadrature with each other, means for vectorially adding said deflection signals from said two circuits, means for comparing the phase of the signal resulting from the addition of these deflection signals with an energization of said reference phase and obtaining the compared phase difference, and means responsive to said compared phase difference for adjusting the angular relationship of said primary and secondary windings of said rotating field device in a direction to reduce any such phase difference whereby the resultant signal is maintained substantially in reference phase as required.

4. A computing arrangement as claimed in claim 2 wherein said means for deriving said direction signal includes means for computing the angle of said slope from the coordinate components of the stylus deflection along the three axes and comprises means for modifying the resultant of said components according to the angles made with one of said axes in said reference plane by the direction of the component of stylus deflection measured in that plane on the one hand and by the contouring plane on the other hand.

5. A computing arrangement as claimed in claim 2 wherein said means for deriving said control signals as a function of the corrected direction signal comprises three phase-conscious demodulators arranged to receive the corrected direction signal in common and to be biased respectively with said velocity signals of which one is in reference phase and of amplitude equal to a given value times the cosine of said angle between the contouring plane and one of the axes, another is in reference phase and of amplitude equal to said given value multiplied by the sine of said angle between the contouring plane and that one axis, and the third is in quadrature phase and of amplitude equal to said given value.

6. A computing arrangement as claimed in claim 3 wherein said means for deriving the signal proportional to the product of said resultant signal and the cosine of the sum of said angles comprises an electro-magnetic induction device having a primary winding arranged to receive said resultant signal and a secondary winding the output from which varies with the cosine of the electrical angle between said primary and secondary windings, said windings being rotatable in opposite directions from an electrically aligned position the one in accordance with one of said angles and the other in accordance with the other angle.

7. A computing arrangement as claimed in claim 4 wherein said means for deriving said direction signal comprises means for adding vectorially deflection signals in phase quadrature representing respectively the magnitudes of the components of stylus deflection along the two axes in said reference plane, means for obtaining from this resultant vectorially added signal a further signal of amplitude proportional to that of the resultant signal multiplied by the cosine of the sum of said angles, means for modifying the phase of said quadrature signals with respect to a reference phase signal in such manner as to maintain in reference phase the signal resulting from such addition, and means for adding to said further signal a signal in quadrature with said reference phase signal and representative of the component of stylus deflection along the remaining axis whereby to obtain the required direction signal.

8. A computing arrangement as claimed in claim 4 wherein the contour tracing apparatus includes means for obtaining signals in phase quadrature representing respectively the magnitudes of the components of stylus deflection along the two axes in said reference plane, and said means for deriving the direction signal comprises means for adding said deflection signals, means for deriving from the signal resulting from such addition a direct current signal of magnitude proportional to the product of the amplitude of this resultant signal and the cosine of the sum of its phase angle with respect to one of said deflection signals and the angle between the contouring plane and the axis to which the latter deflection signal pertains, means for deriving a further alternating current signal of amplitude proportional to the direct current signal and of a reference phase in phase with said one of said deflection signals, and means for adding to the further signal a deflection signal in quadrature phase representing the magnitude of the component of stylus deflection along the remaining axis.

9. A computing arrangement as claimed in claim 7 including a phase correction means for said direction signal comprising means for adding to the sum of said quadrature signals pertaining to the components of stylus deflection along two of the axes a signal in quadrature phase and of amplitude representing the component of stylus deflection along the other axis, means for rectifying the resultant of this latter addition, means for comparing the rectified signal with a direct current reference signal representing in amplitude a desired stylus deflection and obtaining the comparison difference, and means for modifying the phase of the direction signal in accordance with said comparison difference between the compared signals providing a corrected direction signal.

10. A computing arrangement as claimed in claim 8 wherein said means for deriving said direct current signal comprises a phase-conscious demodulator arranged to receive said resultant signal as input and biased with a voltage of phase angle $2\pi$ minus said desired angle of orientation with respect to said one axis relative to said reference phase.

11. A computing arrangement as claimed in claim 8 including a phase correction means comprising means for deriving a rectified signal by rectifying the sum of said quadrature signals pertaining to the components of stylus deflection along two of the axes, means for deriving from said rectified signal an alternating current signal of proportional amplitude and of a reference phase, means for vectorially adding this latter alternating current signal to a signal in quadrature phase and of magnitude proportional to the component of stylus deflection along the other axis, means for rectifying the resultant of this latter addition, means for comparing this latter rectified signal with a direct current reference signal corresponding to a desired stylus deflection and obtaining a comparison difference, and means for modifying the phase of the direction signal in accordance with said comparison difference between the compared signals providing a corrected direction signal.

No references cited.